US011982211B2

(12) United States Patent
Radulescu et al.

(10) Patent No.: US 11,982,211 B2
(45) Date of Patent: May 14, 2024

(54) DIRECT-ACTING SOLENOID HAVING VARIABLE TRIGGERING TIMING FOR ELECTRO-MECHANICAL VALVETRAIN AND ACTUATION LEVERS FOR SWITCHING ROCKER ARMS

(71) Applicant: Eaton Intelligent Power Limited, Dublin (IE)

(72) Inventors: Andrei D. Radulescu, Marshall, MI (US); Andrew Lee, Portage, MI (US)

(73) Assignee: Eaton Intelligent Power Limited, Dublin (IE)

( * ) Notice: Subject to any disclaimer, the term of this patent is extended or adjusted under 35 U.S.C. 154(b) by 11 days.

(21) Appl. No.: 17/273,352

(22) PCT Filed: Sep. 3, 2019

(86) PCT No.: PCT/EP2019/025293
§ 371 (c)(1),
(2) Date: Mar. 4, 2021

(87) PCT Pub. No.: WO2020/048639
PCT Pub. Date: Mar. 12, 2020

(65) Prior Publication Data

US 2021/0246812 A1 Aug. 12, 2021

Related U.S. Application Data

(60) Provisional application No. 62/744,674, filed on Oct. 12, 2018, provisional application No. 62/726,954, filed on Sep. 4, 2018.

(51) Int. Cl.
*F01L 1/18* (2006.01)
*F01L 9/21* (2021.01)
(Continued)

(52) U.S. Cl.
CPC .................. *F01L 1/18* (2013.01); *F01L 9/21* (2021.01); *F01L 13/0005* (2013.01);
(Continued)

(58) Field of Classification Search
CPC . F01L 1/18; F01L 9/21; F01L 13/0005; F01L 2001/186; F01L 2009/2146;
(Continued)

(56) References Cited

U.S. PATENT DOCUMENTS 4,151,817 A 5/1979 Mueller
4,543,927 A 10/1985 Luhn et al.
(Continued)

FOREIGN PATENT DOCUMENTS

DE 2753197 A1 6/1978
WO WO-2014/134601 A1 9/2014
(Continued)

OTHER PUBLICATIONS

International Search Report and Written Opinion for PCT/EP2019/025293; dated Feb. 5, 2020; pp. 1-18.

*Primary Examiner* — Kenneth J Hansen
*Assistant Examiner* — Kelsey L Stanek
(74) *Attorney, Agent, or Firm* — Baker Botts L.L.P.

(57) ABSTRACT

Systems, methods, and control systems for a switching rocker arm assembly are disclosed. A switching rocker arm (10) engages a valve (29), the switching rocker arm (10) is movable by contact with a cam (60) having a lift portion (59) and a base circle (58). The switching rocker arm (10) comprises an inner arm (20), an outer arm (12) pivotably secured to the inner arm (20) and having a latch bore, and a latch pin (28) selectively movable between a first position where the latch pin (28) does not contact the inner arm (20), and a second position wherein the latch pin (28) contacts the inner arm (20). A solenoid assembly (500) is energized while
(Continued)

the rocker arm is in contact with the lift portion (59) of the cam. The solenoid assembly is direct-acting and overhead and is calibratable with respect to the rocker arm.

17 Claims, 10 Drawing Sheets

(51) Int. Cl.
*F01L 13/00* (2006.01)
*F02D 13/06* (2006.01)

(52) U.S. Cl.
CPC ........ *F02D 13/06* (2013.01); *F01L 2001/186* (2013.01); *F01L 2009/2146* (2021.01); *F01L 2009/2173* (2021.01); *F01L 2013/001* (2013.01); *F02D 2200/101* (2013.01)

(58) Field of Classification Search
CPC ......... F01L 2009/2173; F01L 2013/001; F01L 2900/2146; F01L 2900/2173; F02D 13/06; F02D 2200/101
USPC ........................................................ 123/90.15
See application file for complete search history.

(56) References Cited

U.S. PATENT DOCUMENTS

| | | | | |
|---|---|---|---|---|
| 5,623,897 | A | 4/1997 | Hampton et al. | |
| 5,653,198 | A * | 8/1997 | Diggs | F01L 13/0005 123/90.16 |
| 5,682,848 | A | 11/1997 | Hampton et al. | |
| 5,690,066 | A | 11/1997 | Hampton et al. | |
| 5,697,333 | A | 12/1997 | Church et al. | |
| 5,893,344 | A | 4/1999 | Church | |
| 6,092,497 | A | 7/2000 | Preston et al. | |
| 6,273,039 | B1 | 8/2001 | Church | |
| 6,314,928 | B1 | 11/2001 | Baraszu et al. | |
| 6,354,265 | B1 | 3/2002 | Hampton et al. | |
| 6,499,451 | B1 * | 12/2002 | Hendriksma | F01L 1/08 123/90.38 |
| 6,805,083 | B2 | 10/2004 | Kaczmarek et al. | |
| 9,488,075 | B2 | 11/2016 | Radulescu | |
| 2009/0306846 | A1 * | 12/2009 | Jeong | F02D 41/22 702/183 |
| 2018/0045085 | A1 | 2/2018 | Chandler et al. | |
| 2019/0063268 | A1 | 2/2019 | Buonocore et al. | |
| 2019/0072011 | A1 | 3/2019 | Cecur et al. | |
| 2019/0331039 | A1 * | 10/2019 | Shelby | F02D 41/0087 |

FOREIGN PATENT DOCUMENTS

| | | | | |
|---|---|---|---|---|
| WO | WO-2015181264 | A1 * | 12/2015 | F01L 1/047 |
| WO | WO-2017/060490 | A1 | 4/2017 | |
| WO | WO-2017144706 | A1 * | 8/2017 | F01L 1/185 |

* cited by examiner

DIRECT-ACTING SOLENOID HAVING VARIABLE TRIGGERING TIMING FOR ELECTRO-MECHANICAL VALVETRAIN AND ACTUATION LEVERS FOR SWITCHING ROCKER ARMS

This is a § 371 National Stage Entry of Patent Cooperation Treaty Application No. PCT/EP2019/025293, filed Sep. 3, 2019 which claims the benefit of U.S. provisional application No. 62/744,674, filed Oct. 12, 2018, and which claims the benefit of U.S. provisional application 62/726,954 filed Sep. 4, 2018 all of which are incorporated herein by reference.

FIELD

This application provides an overhead solenoid arrangement, an actuation lever arrangement, a switching rocker arm arrangement, and methods for their use including methods for minimizing the mechanical resistance at the solenoid, methods for commanding switching of the solenoid while the rocker arm is on lift, and methods for varying the triggering timing for the valvetrain.

BACKGROUND

A switching roller finger follower or rocker arm allows for control of valve actuation by alternating between two or more states. In some examples, the rocker arm can include multiple arms, such as an inner arm and an outer arm. In some circumstances, these arms can engage different cam lobes, such as low-lift lobes, high-lift lobes, and no-lift lobes. Mechanisms are required for switching rocker arm modes in a manner suited for operation of internal combustion engines.

The switching mechanisms must fit into a tight compartment and it is challenging to arrange the switching mechanisms according to all customer constraints. Particularly, it has been difficult to fit electrification equipment into the engine compartment.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In the context of cylinder deactivation actuation, the time "window" allowed for switching between activated and deactivate modes is dependent on engine speed. However, solenoid response time is independent of engine speed. If the solenoid were to be triggered at a constant point in the engine cycle, it would complete its motion at a different point in the engine cycle depending on speed. So, it is desired to vary the timing for the solenoid triggering so that the actual motion of the solenoid comports with the desired valve actuation.

The inventors have also discovered a timing for triggering the solenoid that ultimately permits reduction in the mass of the solenoid. Alternative compliance spring arrangements, alternative actuator assemblies, and various latches and rocker arms are compatible with the timing technique. The smaller solenoid is better suited to install directly over the rocker arm or arms on which it is acting. This fits the engine compartment footprint efficiently. And, the solenoid is direct-acting. Additional benefits can accumulate because the relationship among the solenoid, actuator assembly and rocker arm is calibratable. Gap settings and variances are tighter through alignment techniques.

Systems, methods, and control systems for a switching rocker arm assembly are disclosed. A switching rocker arm engages a valve, the switching rocker arm is movable by contact with a cam having a lift portion and a base circle. The switching rocker arm comprises an inner arm, an outer arm pivotably secured to the inner arm and having a latch bore, and a latch pin selectively movable between a first position where the latch pin does not contact the inner arm, and a second position wherein the latch pin contacts the inner arm. A solenoid assembly is energized while the rocker arm is in contact with the lift portion of the cam. The solenoid assembly is direct-acting and overhead and is calibratable with respect to the rocker arm. Actuating the solenoid as disclosed leads to the switching of the switchable rocker arm occurring on base circle such that the latch pin moves to the first position where the latch pin does not contact the inner arm The switching rocker arm can comprise a latch pin and a latch lever extending from the latch pin. With the solenoid assembly overhead, new actuation levers have been developed. So, a switching rocker arm assembly can comprise an actuation lever that is selectively movable into contact with the latch lever, the latch lever configured to urge the latch pin into the second position when the actuation lever contacts the latch lever. The actuation lever can comprise a spring-loaded hinge, and energizing the solenoid while the rocker arm is in contact with the lift portion of the cam can result in the spring-loaded hinge being pre-loaded so that the actuation lever acts on the latch lever to urge the latch pin into the second position as the cam rotates from the lift portion to base circle.

The solenoid assembly can be an electromechanical solenoid and can comprise an armature biased by at least one compliance spring out of the solenoid assembly. The actuation lever extending between the solenoid assembly and the switching rocker arm can alternatively or additionally comprise a linkage between the armature and the actuation lever comprising a pin in a slot. The slot can be tailored to control actuation forces for moving the actuation lever and the latch pin. The slot can vary between an oblong "pill" shape and a curved shape such as a crescent.

When applying methods for switching the switchable rocker arm assembly, several alternatives are available. The methods can comprise processing engine speed data to select a timing of triggering for the solenoid assembly to energize, and adjusting the timing of triggering of the solenoid assembly as the engine speed data indicates a change in engine speed. The methods can comprise determining an operating temperature of the system; determining a voltage available to the solenoid in the system; determining a timing of triggering of the solenoid based on the determined temperature and voltage; and commanding the solenoid to trigger based on the determined timing. Control hardware and stored programming can enable the methods, and a storage device of the control hardware can further comprise a look-up table ("LUT") that corresponds to a given engine speed. Additional data such as temperature data can be collected and correlated to the LUT. The methods can vary the valve actuation timing for variable valve actuation techniques such as cylinder deactivation (CDA), internal exhaust gas recirculation (iEGR, reverse breathing, rebreathing), Negative Valve Overlap (NVO), early or late valve opening or closing techniques (EEVO, EIVO, EIVC, EEVC, LIVO, LEVO, LIVC, LEVC), engine braking (EB, CRB), among the many alternative variable lift events. So, the timing of triggering determined relative to a sequence of a first, a second and a third lift event, and wherein determining the timing comprises determining a preferred timing such that switching of a rocker arm associated with the solenoid concludes subsequent to the second lift event.

The rocker arm can include design features for variable lift as can the cam lobe associated with rocker arm. While a type II end pivot rocker arm is shown in the drawings, the assembly is not limited thereto. Other latched rocker arms can benefit from the overhead solenoid and actuation levers disclosed herein.

A control system can be implemented for operating an electro-mechanical valvetrain cylinder deactivation system. The control system can comprise a switching rocker arm having an inner arm, an outer arm and a latch pin selectively movable between a first position where the latch pin does not contact the inner arm, and a second position wherein the latch pin contacts the inner arm. A solenoid assembly connected to the control system can be triggered by the control system, resulting in selective actuation of the latch pin. A controller determines a timing of the triggering of the solenoid assembly based on a temperature and a voltage of the electro-mechanical valvetrain cylinder deactivation system.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Reference will now be made in detail to the examples which are illustrated in the accompanying drawings. Directional references such as "left" and "right" are for ease of reference to the figures and are not limiting of the invention in its practical installation. Overhead, however, can be construed as being atop the rocker arm assembly and as pertains the solenoid assembly, overhead can be construed as the armature arranged to actuate substantially transverse to the latch pin.

Figure 1:
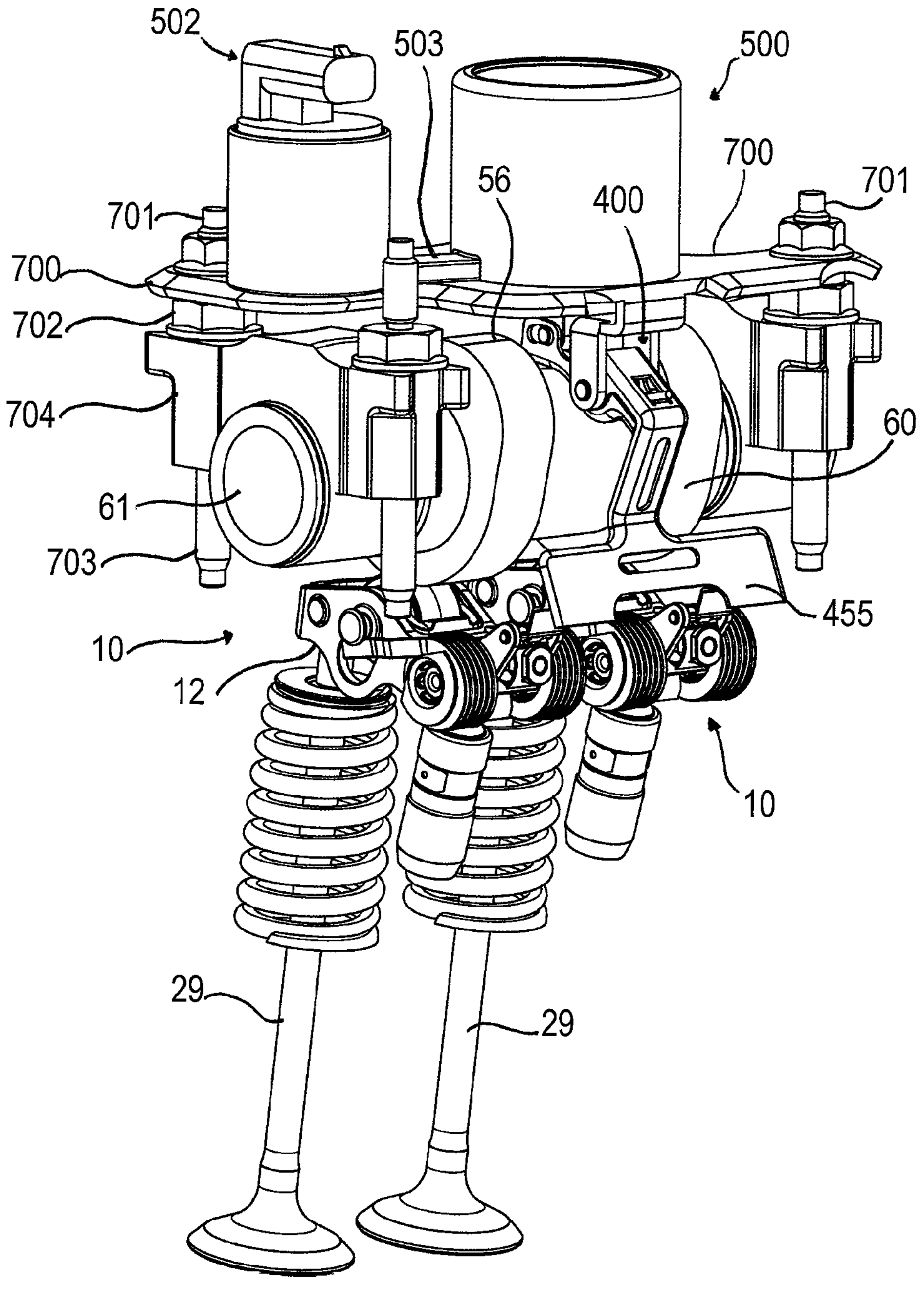
FIG. 1 is a view of a rocker arm assembly comprising two switching rocker arms and one solenoid assembly; the actuation lever is adapted to actuate both switching rocker arms.

FIG. 1 shows an example of a switching rocker arm system comprising a solenoid assembly 500 connected to a mounting plate 700 (sometimes called a tower). A plug assembly 502 and line 503 can transfer electrical power and control system signals to the solenoid assembly 500. In this example, two switching rocker arms 10 are actuated by one solenoid assembly 500. Cam lobes 60 on a camshaft 61 can comprise one or more lift profiles and a base circle to impart any one of normal valve lift, no lift, or variable valve lift profiles. The tower can be mounted relative to the camshaft 61 or can comprise mountings for the camshaft 61. The paddle 455 of swinging second actuation arm 450 is adapted to actuate latch pins in both switching rocker arms 10.

The plate 700 can be aligned relative to the rocker arms 10 as by a calibratable alignment of mounting pins 701, which improves the accuracy of the actuation of the valves 29. For example, the mounting pins 701 can be aligned with the engine block or a carrier 704 comprising cam rail mount or both. A first alignment nut or bushing 702 can be welded or tightened to secure the tower with respect to the engine block and cam rail mount 704. But, the mounting plate 700 can comprise holes surrounding top ends of mounting pins 701. The holes can comprise an amount of "play" or variance such that the solenoid assembly 500 can be moved relative to the cam shaft 61 and switching rocker arms 10. A gage or other calibration device can be used to set the location of the solenoid assembly 500 relative to the rocker arms 10. Or, the actuation lever 400 can be the aligned relative to the rocker arms 10, particularly relative to the latch pin 28 and latch lever 30. Mounting pins 701 can be locked in place once the alignment technique is completed.

In an alternative, bushing 702 can be aligned via a gage or other alignment tool in an alignment slot of plate 700. The bushing can be secured as by welding, tightening or the like to the carrier 704, which carrier also serves as a base for the solenoid assembly when the carrier 704 is aligned with the cylinder head, which has the rocker arms 10 aligned thereto, the solenoid assembly 500 is aligned, the actuation arm is aligned, and the contact gap 92, 94 is constrained. An alignment pin of the cylinder head can protrude through the bushing 702. The carrier can comprise one or more alignment slots with corresponding aligned bushing 702.

Figure 2B:
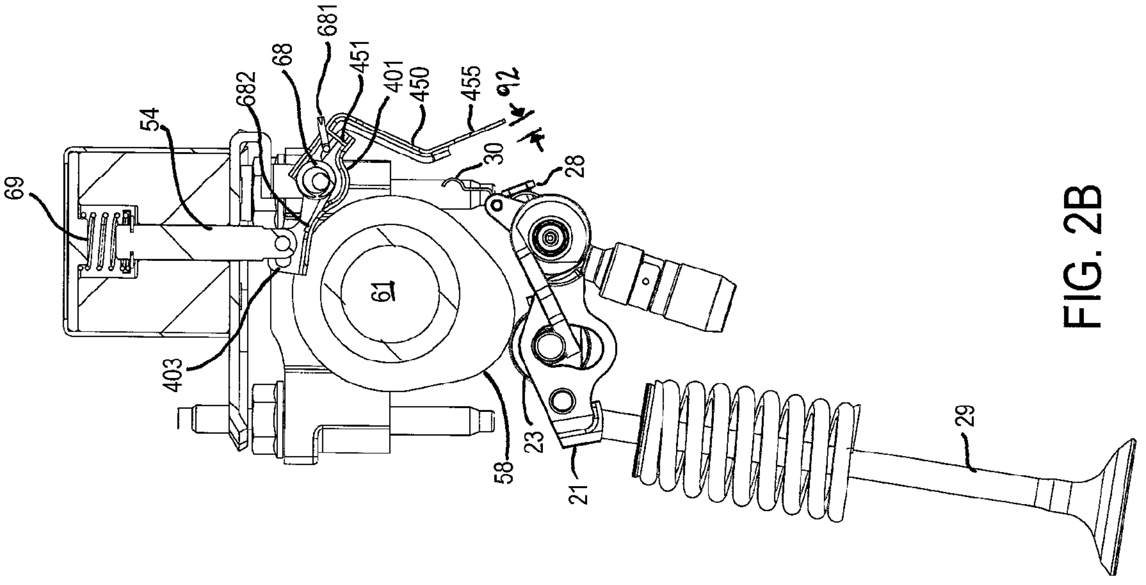
FIGS. 2A-2G are section views of the rocker arm assembly showing the cam position relative to the rocker arm and actuation lever.
Figure 2A:
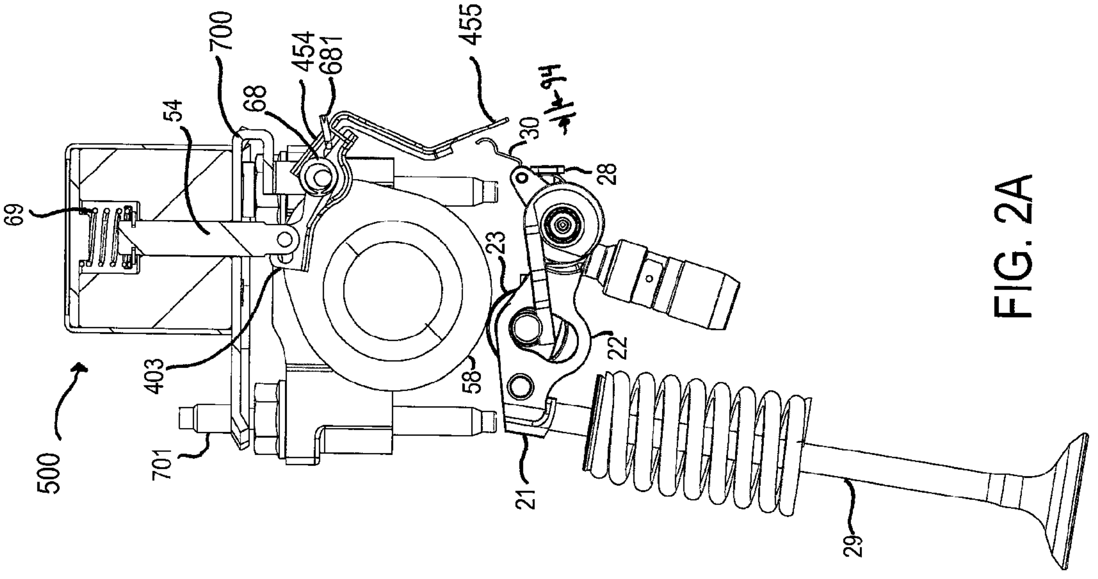
Figure 2C:
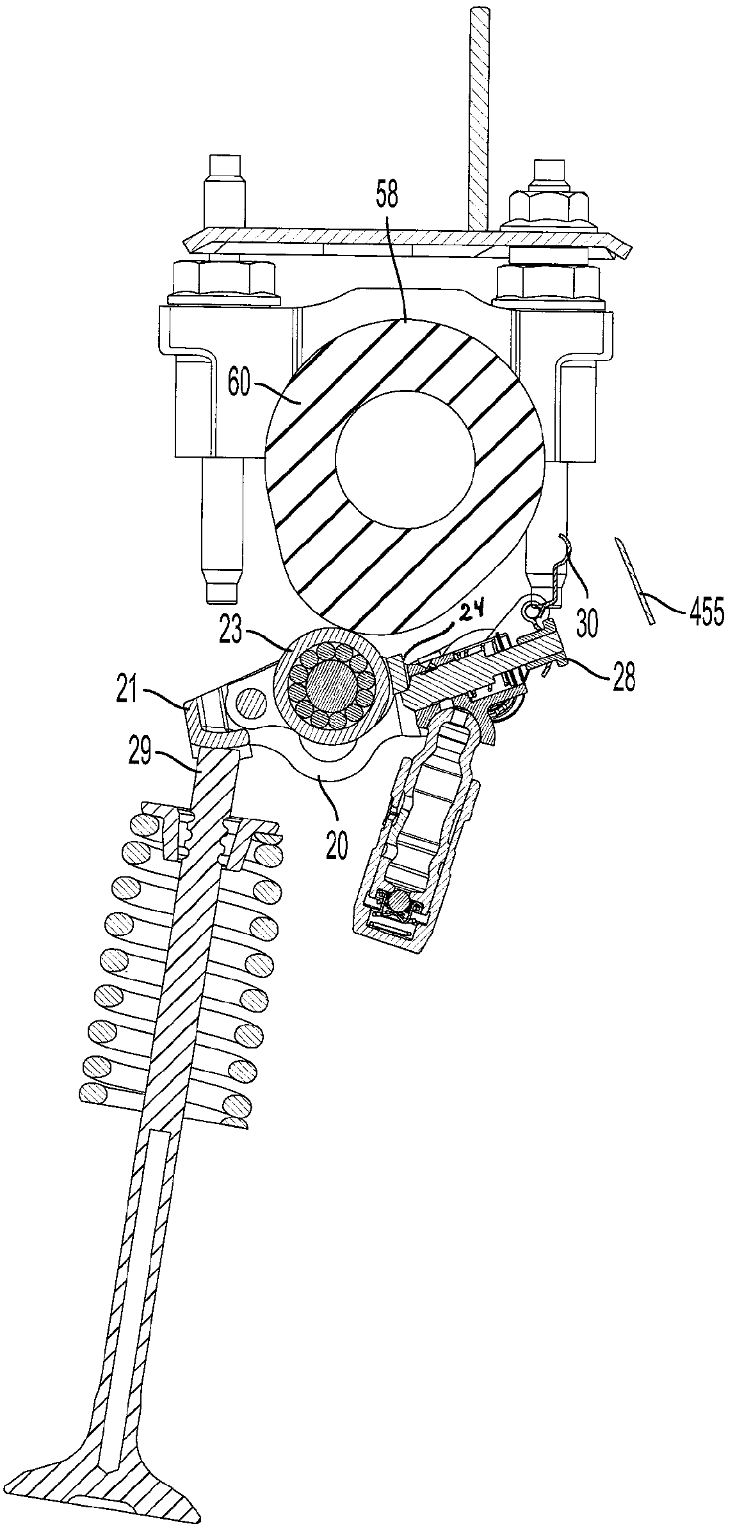

FIGS. 2A-2G show section views of the rocker arm assembly showing the cam 60 position relative to the switching rocker arms 10 and actuation lever 400. A nominal operation is shown in FIGS. 2A-2C. The solenoid assembly 500 is not powered, so a spring 69 pushes the armature 54 out of the solenoid assembly 500. The latch pin 28 has its latch end 280 engaged with the inner arm ledge 24. The valves 29 can operate in the nominal mode as a default.

Figure 2E:
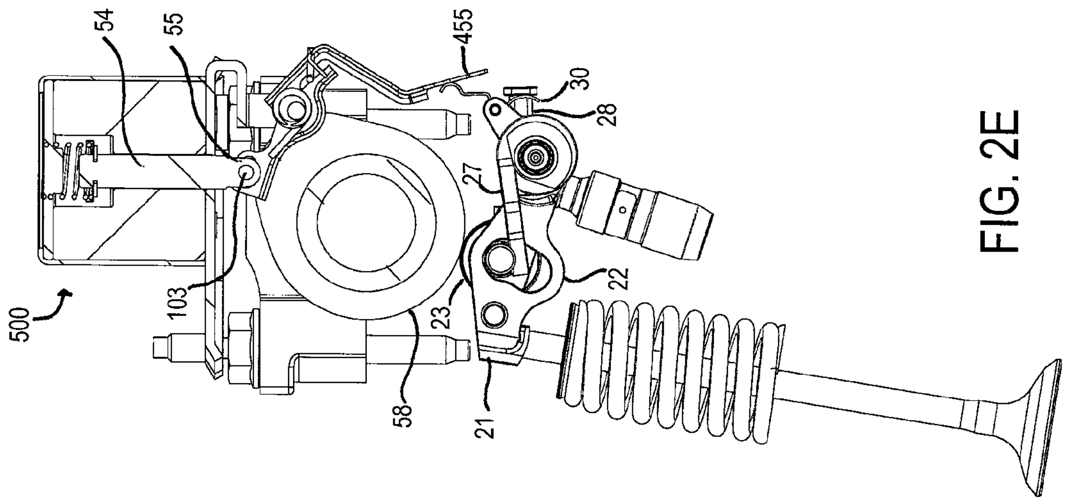
Figure 2D:
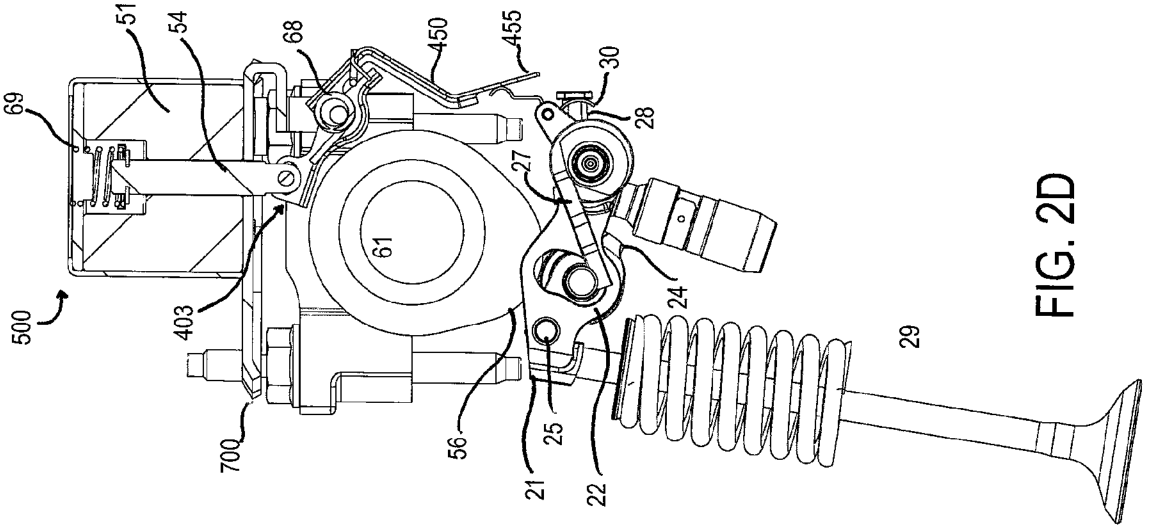
Figure 2F:
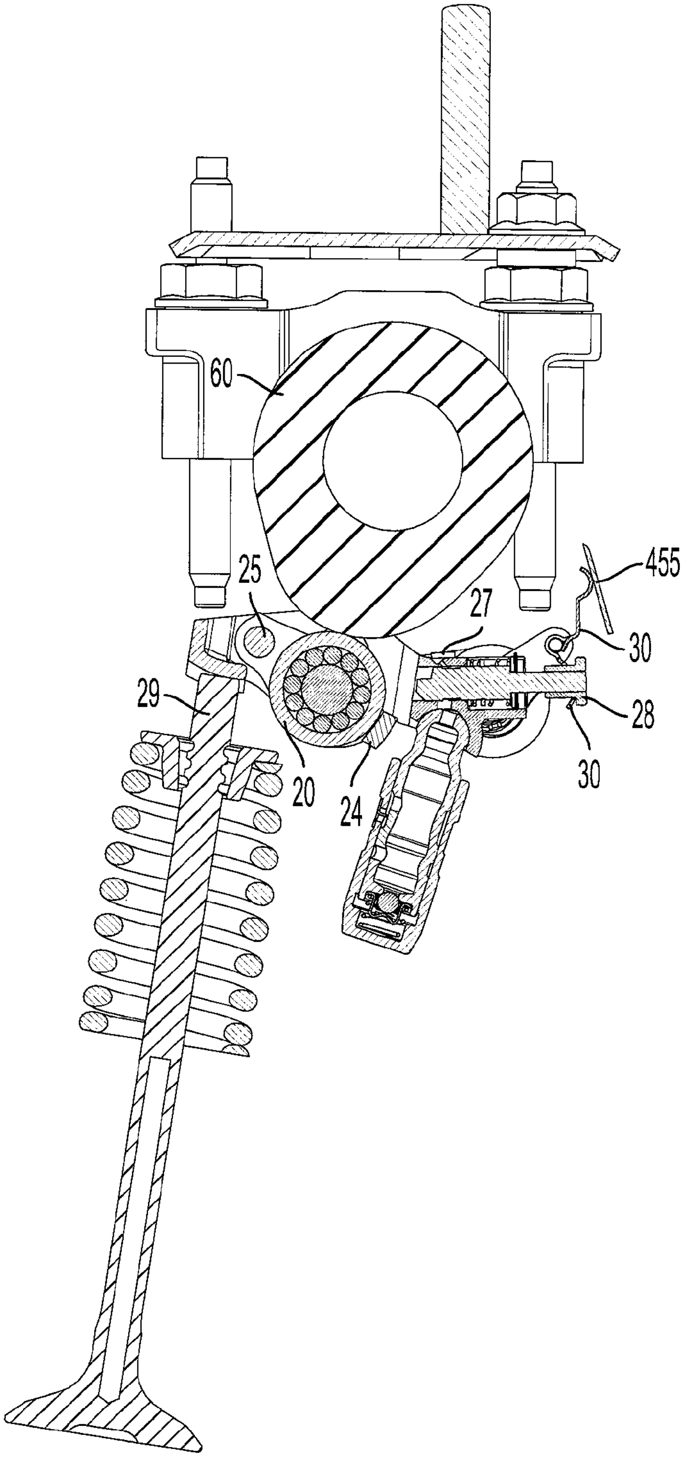

In FIG. 2A, base circle 58 of the cam lobe 60 is acting on the roller 23 of the switching rocker arm 10. Switching rocker arm 10 is movable by contact with cam 60 having a lift portion 59 and a base circle 58. Switching rocker arm 10 engages a valve 29. Valve 29 on valve end 21 is closed with respect to a corresponding engine cylinder. The switching rocker arm 10 comprises an inner arm 20 and an outer arm 12 pivotably secured to the inner arm 20 at pivot 25. Inner arm can swing as shown in FIGS. 2D & 2F and a travel limit 22 in outer arm 12 can be reached by a pin extending from inner arm 20. A lost motion spring 27 can bias the inner arm 20 towards the cam 60. On latch end of switching rocker arm, a latch pin 28 can be biased in a latch bore. Latch pin 28 is selectively movable between a first position where the latch pin does not contact the inner arm ledge 24 of inner arm, and a second position wherein the latch pin 28 contacts the inner arm ledge 24. A latch spring 26 can bias the latch pin 28 in the bore 281 towards the second position. FIGS. 2A-2C comprise the latch pin 28 in the second position. FIGS. 2D-2G comprise the latch pin 28 in the first position. The switching rocker arm 10 can comprise latch lever 30 extending from the latch pin 28. Latch lever 30 can couple to an end of the latch pin 28 as by legs, a cleat, or other catch surrounding the end of the latch pin 28, and the latch pin 28 can further comprise a divot, cap or other anchor for the legs, catch, or cleat.

The solenoid assembly 500 is direct-acting and overhead and is calibratable and alignable with respect to the switching rocker arm 10. In FIGS. 2A-2C, the coil 51 is not powered. With the solenoid assembly 500 overhead, new actuation levers have been developed. In a first alternative, actuation lever 400 is selectively movable into contact with the latch lever 30. In FIGS. 2A & 2B, the nominal lift modes, the actuation lever 400 does not act on the latch lever 30. So, a gap is present between the actuation lever 400 and the latch lever 30.

In FIGS. 2D-2G, the latch lever 30 is configured to urge the latch pin 28 into the first position when the actuation lever 400 contacts the latch lever 30. The actuation lever 400 can comprise a spring-loaded hinge, and energizing the solenoid assembly coil 51 while the rocker arm 10 is in contact with the lift portion 56 of the cam 60 can result in the spring-loaded hinge being pre-loaded so that the actuation lever 400 acts on the latch lever 30 to urge the latch pin 28 into the first position as the cam 60 rotates from the lift portion 56 to base circle 58.

The solenoid assembly 500 can be energized while the rocker arm 10 is in contact with the lift portion 56 of the cam 60. Actuating the solenoid as disclosed leads to the switching of the switchable rocker arm 10 occurring on base circle 58 such that the latch pin 28 moves to the first position where the latch pin does not contact the inner arm 20. Preloading the actuation lever 400 while the valve 29 is on lift and the lift portion 56 is in contact with the roller 23 yields benefits in downsizing the solenoid. The spring 68 in the spring-hinge provides actuation force to move the latch pin 28 in a complementary manner to the forces from the solenoid assembly 500. With the additive force from the compliance spring 68, the coil 51 of the solenoid can be smaller and less powerful. This leads to energy, heat, and space savings. With the valve on lift, the force on the latch pin 28 is initially too great to disengage the latch end 280 from the inner arm ledge 24, but as the cam 60 rotates to base circle 56 from the lift portion 58, the force on the roller 23 and inner arm 20 reduces and the latch pin 28 can slide in the latch bore 281 as the paddle 455 of actuation lever 400 acts on latch lever 30 to pivot the latch lever 30. A pivot pin 102 or stake can be used to mount latch lever 30 to the rocker arm 10 in a pivoting relationship.

The solenoid assembly can be an electromechanical solenoid and can comprise an armature 54 biased by at least one compliance spring 67, 65, 68, 69 out of the solenoid assembly 500. The actuation lever 40, 400 extending between the solenoid assembly 500 and the switching rocker arm 10 can alternatively or additionally comprise a linkage between the armature 53, 54 and the actuation lever 40, 400 comprising a pin 101, 103 in a slot 45, 87, 403, 403. The slot can be tailored to control actuation forces for moving the actuation lever 40, 400 and the latch pin 28. The slot can vary between an oblong "pill" shape and a curved shape such as a crescent, as shown in FIG. 5A.

The compliance springs 65, 67, 68, 69 can perform several functions, including biasing the armature out of the solenoid to ensure normal operation is always available as a default mode; reduction of assembly stack up as by creating a nominal contact gap between the actuation lever 40, 400 and the latch pin assembly; assisting with setting a precise contact gap as by a feeler gauge; setting the triggering timing as by providing a consistent gap for the extent that the armature extends from the solenoid assembly; storing energy used for pulling the latch pin 28 out of the rocker arm 10.

Actuation lever 400 can comprise a first actuation arm 401 and a second actuation arm 450. First actuation arm 401 can comprise the slot 403, 87 for interfacing the linkage end 55 of the armature and linkage pin 103. The second actuation arm 450 is designed to move as a spring-loaded hinge. So, a second linkage pin 104 can join a pivot point 402 of the first actuation arm 401 with a pivot point 453 of the second actuation arm 450 with the compliance spring 68 coiled or otherwise seated in cup 405. When the compliance spring 68 is a torsion spring, it can be coiled around the second linkage pin 104. Other springs like leaf springs can be appropriately mounted. Compliance spring 68 has a spring end 682 pressing against first actuation arm 401 and a spring end 681 pressing against second actuation arm 450; compliance spring 68 can maintain minimum contacts therebetween. Spring end 681 can pass through a window 452 in second actuation arm 450. A torsional spring or leaf spring or the like can be used and arranged to bias the second actuation arm 450. A pressure point formed at stake 451 and seat 406 yields a hinge location. Linkage end 454 of second actuation arm 450 is positioned relative to pivot point 453 and stake 451 in seat 406. Paddle end 455 of second actuation arm 450 swings as the solenoid assembly 500 draws the armature 54 or releases the armature. When there is a gap 92 or 94, the paddle end 455 receives no pressure other than the spring pressure from spring end 682. But when the paddle end 455 contacts the latch lever 30, the second actuation arm 450 can hinge and put pressure on the compliance spring 68, which stores energy in the compliance spring 68 for moving the latch pin 28. As disclosed, one technique for moving the latch pin is to trigger the solenoid when the valve is on lift, which yields a situation where the latch pin 28 is receiving too much force to move. So if the paddle pushes against the latch lever 30, it causes a hinging force and loading of the compliance spring 68. The force stored in the spring can be released to act on the latch pin 28 when the valve comes off lift as detailed herein.

While the actuation lever 400 comprises two actuation arms and two pivot points (linkage and hinge), the actuation lever 40 is a contiguous piece that comprises two pivot points. The actuation lever 40 comprises a controlled slot 45 that can be shaped as oblong 87 or crescent 403 as in FIG. 5A among variations of the examples to impact the moment of the actuation lever 40 as the solenoid assembly 500 moved the armature 52. Extension 53 of the armature 52 can comprise a hook, a post or the like to constitute pin 101, or a pin in a port can constitute pin 101. A sheath, plug or other fixture can set the compliance spring 66 relative to the extension 53. A second pivot point formed by material 43 around at pin 100 can trajectory the actuation arm 40. First arm portion 44 spans between first and second pivot points. Second arm portion 42 extends from the second pivot point to contact latch lever 30 or form gaps like gaps 92, 94. A paddle 46 can also be formed at the extrema of second arm portion 42 so that more than one switching rocker arm 10 can be actuated by a single solenoid assembly 500. Or, the paddle 46 can be limited to act on only one rocker arm in a one-to-one relationship.

Figure 2G:
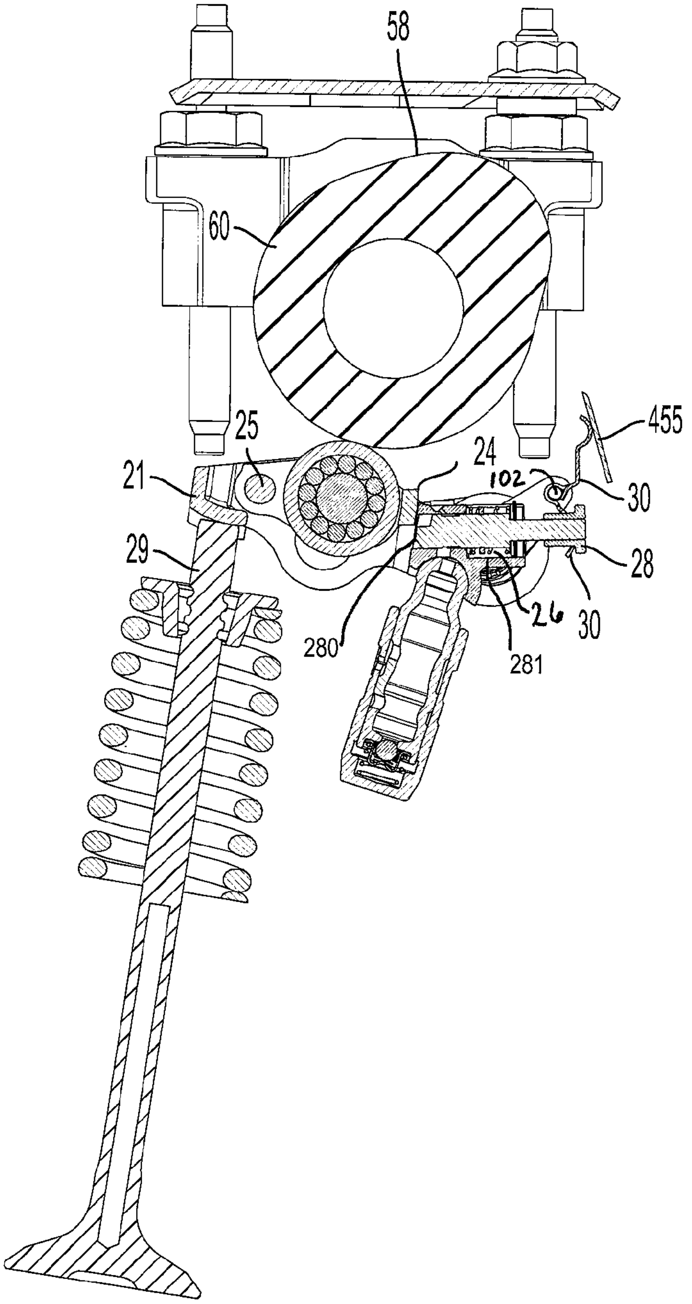
Figure 3:
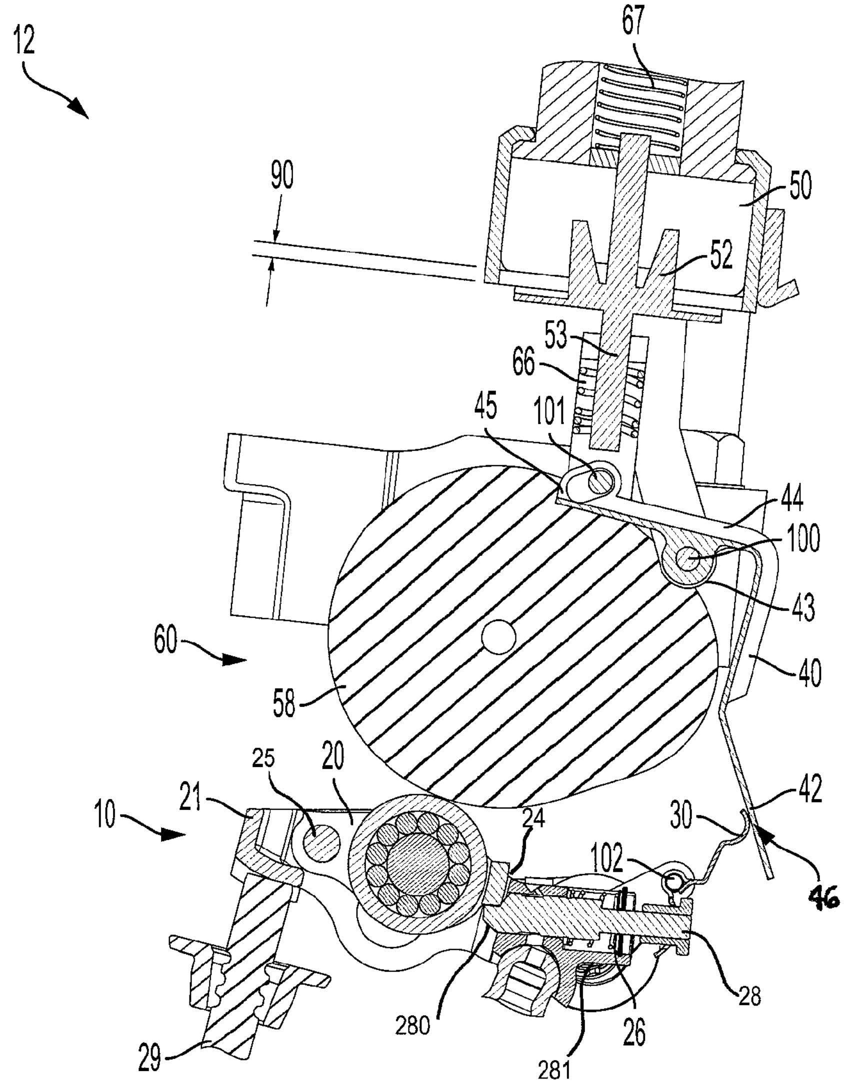
FIG. 3 is a cross-section view of an alternative rocker arm assembly comprising one switching rocker arm and one solenoid assembly; an alternative actuation lever is also shown.
Figure 4A:
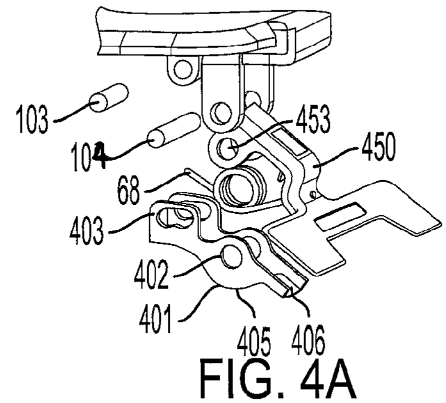
FIGS. 4A & 4B show an exploded and assembled view of a spring-loaded hinge actuation lever and a linkage between the armature of the solenoid assembly and the actuation lever.
Figure 4B:
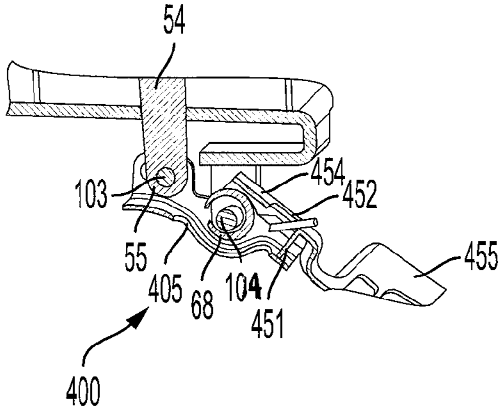

With reference to FIG. 3, an exemplary switching rocker arm constructed in accordance to one example of the present disclosure is shown and generally identified at reference 10. The switching rocker arm 10 is shown as part of an electromechanical variable valve actuation valvetrain system 12 such as a cylinder deactivation system. The switching rocker arm 10 has an inner arm 20 and an outer arm 22. A latch 28 is movable between an engaged position (FIG. 3) and a retracted position (similar to FIGS. 2F & 2G). A spring 26 normally biases the latch 28 into the latched position. The rocker arm 10 is switchable between a high-lift mode and a low-lift mode. In the high-lift mode, the outer arm 12 is latched to the inner arm 20. In a low-lift mode, the latch 28 is urged along a latch bore 281 in a direction rightward out of engagement with the inner arm 22. Movement of the rocker arm 10 causes translation of a valve 29.

A latch pin lever 30 extends from the latch 28 and is arranged to be engaged by an actuation lever 40. A solenoid coil 50 energizes causing an armature 52 to move to close a gap 90. That is, the armature 52 is drawn into the solenoid assembly 500 when the coil 50 is energized, which lifts the actuation lever 40 and cants the actuation lever to press the paddle 42 into contact with the latch lever 30. As will become appreciated from the following discussion, the solenoid coil 50 is energized while the valve 29 is on lift (corresponding to cam lobe or lift portion 56 on cam 60). By switching on valve lift (rather than on the base circle 58 of the cam 60), mechanical resistance on the solenoid assembly is minimized. The compliance springs 67, 66 and latch spring 26 are reducing the available force provided by the solenoid assembly, but the actuation lever 40 is designed to increase the available force. The solenoid coil 50 has the highest force when the motion of the armature 52 is complete (such as 50N for example) as compared to 15N when the solenoid coil 50 is first energized.

Figure 5B:
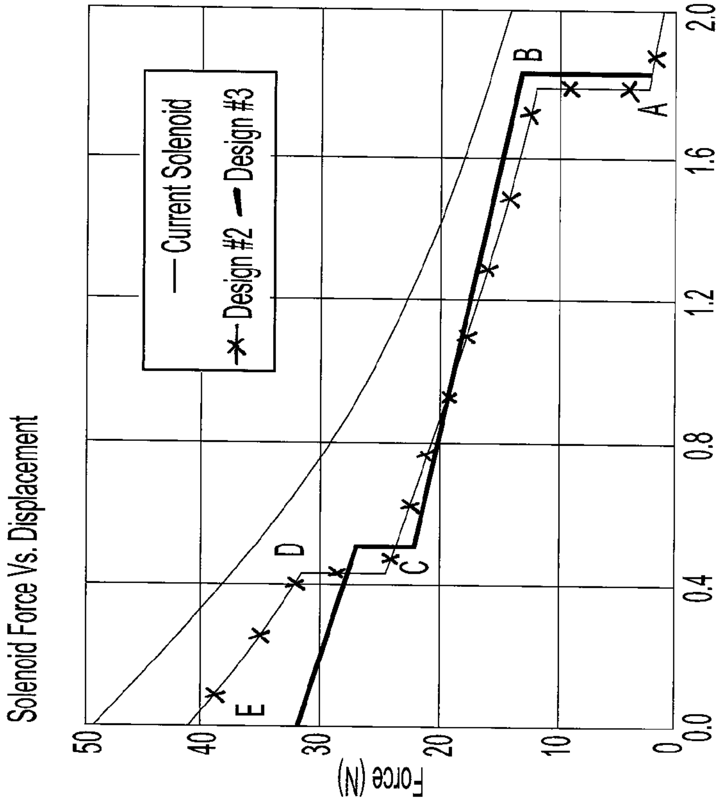
FIG. 5B illustrates alternative actuation forces.
Figure 5A:
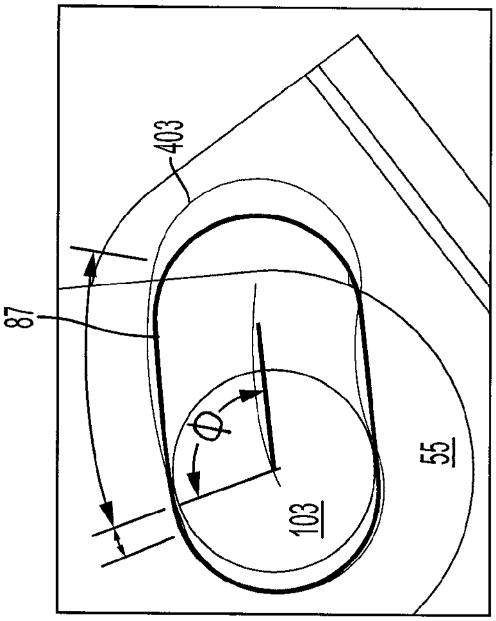
FIG. 5A illustrates alternative slots in the linkage.

Turning now to FIG. 5B, additional features will be described. In area A, the initial spring force pulling the solenoid down is present when the solenoid air gap 90 is largest. To begin closing the gap 90, the force from the solenoid assembly is needed. The solenoid coil 50 is initially energized in area B. As the cam 60 rotates from lift portion 56 in contact with roller 23 to base circle 58 in contact with roller 23, the latch pin 28 travels and forces reach area C. Compliance spring forces then contribute to close the latch 28 (move latch 28 to the second position from the first position) and forces are in area D. Area E represents force needed to reset the armature. The current solenoid line is directed to the maximum force that the solenoid coil 50 can provide, and it can be seen that the latch motion can be achieved within the limitations of the solenoid coil 50. The system is reliable. The bold line versus the x-dashed line illustrate tradeoffs between linkage designs of FIG. 5A. Having play, or the ability of linkage pin 103 to move in slot 45, 403 of the actuation lever 40, 400 adjusts the forces needed to move the latch pin 28. The slot 45, 403 controls the moment of the first arm 401 of the actuation lever 400 and the moment of arm 44 of actuation lever 40 as the arms pivot when the solenoid actuates. An oblong or pill shaped slot 87 gives linear play to the linkage pin 103 while a curved slot, such as crescent shaped slot 403, gives non-linear play to the linkage pin. Controlling the slot 45, 403 can help reduce stackup and control the gap between the actuation lever 40, 400 and the latch lever 30. Linkage pin 53 can be mounted in linkage end 55 of armature 52, 54. An armature extension 53 can protrude from the armature 52 to adjust the forces to linkage.

Returning now to FIGS. 2A-2C, the rocker arm 10 is in lift mode. As the camshaft rotates and the solenoid coil 50 is not energized there is a gap 90 at the armature 52. On base circle, a gap 94 also exists between the actuation lever 40 and the latch lever 30. Because there is no contact, nothing is moving the latch pin 28. When on lift (lobe 56 of the cam 60 is engaging the rocker arm roller 23), a gap 92 exists between the actuation lever 40 and latch lever 30. The gap 92 is bigger than the gap 94. According to the present disclosure, this is the time the solenoid coil 50, 51 is energized. In this regard, all of the solenoid/armature motion is completed while this large gap 92 exists. No resistance exists at the actuation lever 40 due to the gap 92.

The latch 28 is moved to the retracted position such as to transition from lift to cylinder deactivation. Turning to FIGS. 2E & 2G, on base circle following the triggering of the solenoid assembly 500, no gap exists between the actuation lever 40 and the latch lever 30. The solenoid coil 50 is energized and the armature gap 90 is 0. As the armature 52 is moving up, the actuation lever 40 is moving (pivoting around pin 100) toward the cam 60. The actuation lever 40, 400 rotates clockwise to contact with the latch lever 30 and pull the latch pin 28 into the latch bore 281 and out of contact with the inner arm ledge 24. As the cam rotates to the lift portion 56, lost motion can be achieved (FIGS. 2D & 2F). When the desired extent of lost motion has been achieved, the power to the solenoid coil 50, 51 can be discontinued. Then, when the cam 60 returns again to base circle 58 after de-energizing the solenoid assembly, there is no actuation lever 40, 400 forcing the latch lever 30 to rotate counterclockwise around a pin 102 to pull the latch 28 out of engagement with the inner arm 20. The latch spring 26 is biased in the latch bore 281 to push the latch pin 28 to the second position away from the first position to project the latch end 280 to catch under the inner arm edge 24. The lost motion spring 27 can bias the inner arm 20 so that the inner arm edge 24 is above the latch end 280 when base circle 58 is near the roller 23. The present disclosure minimizes the mechanical resistance to latch pin motion such that the solenoid assembly 500 has minimal force to overcome. This advantage, according to the present disclosure, the solenoid coil 50, 51 is energized when there is a maximum gap between the latch pin lever 30 and the actuation lever 40 (gap 92).

The instant disclosure further provides a method for triggering the solenoid coil 50, 51 in an electro-mechanical cylinder deactivation valvetrain system or other variable valve actuation valvetrain at a variable time within the engine cycle as a function of temperature, voltage, and engine speed. The method maximizes the available force in the solenoid assembly 500 and allows for switching in a consistent manner regardless of solenoid response time. In general, the force available in an electro-mechanical solenoid depends on temperature and voltage. This has a significant effect on both the solenoid's ability to successfully perform the intended function as well as the response time it takes to complete that function.

Since the force available in the solenoid assembly 500 varies, there are certain combinations of temperature and voltage that require the solenoid motion to occur while the valve 29 is "on lift" because the rocker arm 10 moves out of the way at this point in the cycle, allowing the actuation mechanism 40, 400 to move with very little mechanical resistance. Such cases also require early pre-triggering of the solenoid 50 to begin building force before the valve 29 goes on lift in order to successfully complete its motion. However, for other combinations of temperature and voltage where the available force is significantly higher, triggering this early may result in unintended movement or partial disengagement of the rocker arm latch 24, which could result in mis-shifting or critical shifting between cylinder activated and deactivated modes. In this regard, the resistance in the solenoid assembly 500 changes as a function of temperature, and as a function of changes of voltage (e.g., battery in the vehicle). As the resistance varies, the amount of force the solenoid assembly is able to generate also varies. As a result, the timing of solenoid triggering is a function of temperature and voltage. Furthermore, engine speed will impact proper timing of the solenoid triggering.

As will become appreciated herein, the present teachings provide methods for triggering the solenoid coil 50, 51 at a variable point in the engine cycle such that it completes its motion at the appropriate time. The triggering timing is determined by way of analytical simulations (and physical testing) of the actuation system. The response time of the solenoid assembly 500 at various operating points is predicted. Further, the methods determine whether switching "on lift" would be required to successfully complete actuation. A series of maps of triggering timings are generated. The maps can be further adjusted as a function of engine speed to match up time with crank angle position.

Plots can be created and correlated to lookup tables to algorithmically correlate solenoid force versus temperature and voltage. Such can be correlated to the size of the solenoid air gap. And discrepancy between minimum and maximum force and air gap sized can be accounted for in the control system. Force changes to close various sized gaps can be programmed in the control system with corresponding methods for implementations so that as temperature and voltage change, the air gap can be closed while the valve is on lift.

Figure 7:
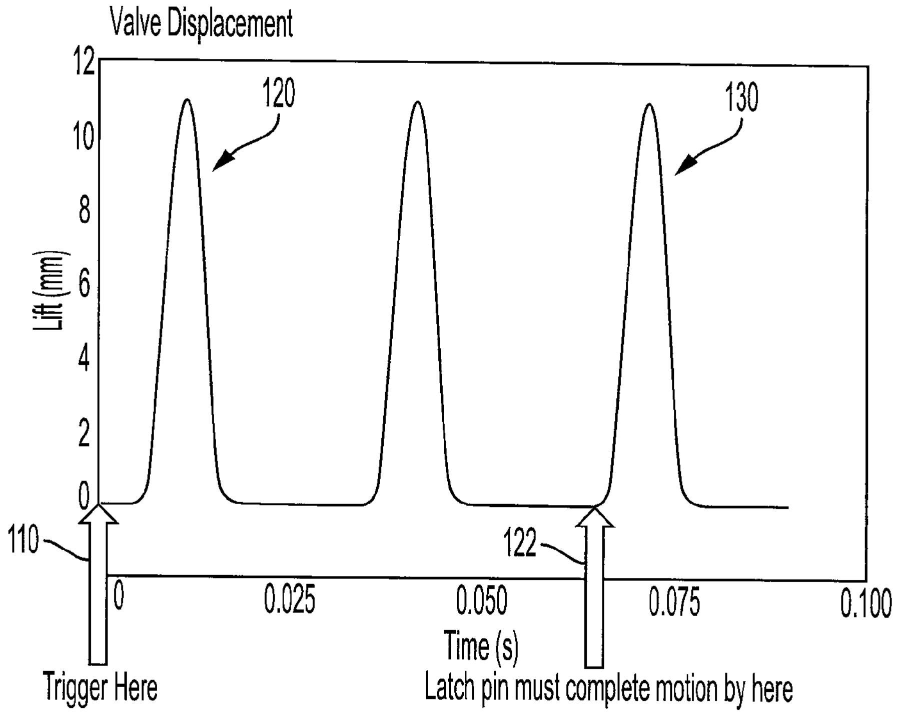
FIGS. 7 & 8 illustrate aspects of triggering versus valve lift.

Trigger timings can be established. FIG. 7 illustrates a constant trigger or on-time WA strategy. The solenoid assembly 500 is triggered at time 110 just before a first lift event 120. At time 122, the latch pin 24 needs to complete its motion, which is just before the third lift event 130. It is possible to implement algorithms to trigger the solenoid at the same place in the valve lift cycle when the variable valve actuation technique is desired so that when the solenoid assembly is triggered at location 110 of the valve lift profile, just before lift event 120 caused by lift profile 56, the latch pin 28 can complete its motion of unlatching and re-latching by the location 122 before third lift event 130. When the engine speed varies, the timings for the valve lift events 120, 130 will change (in seconds) and so the triggering timing will correspondingly adjust. In this WA strategy, the control system algorithmically adjusts the trigger timing for engine speed (and also for temperature and voltage) so that triggering occurs relative to the valve lift in a consistent manner.

Figure 8:
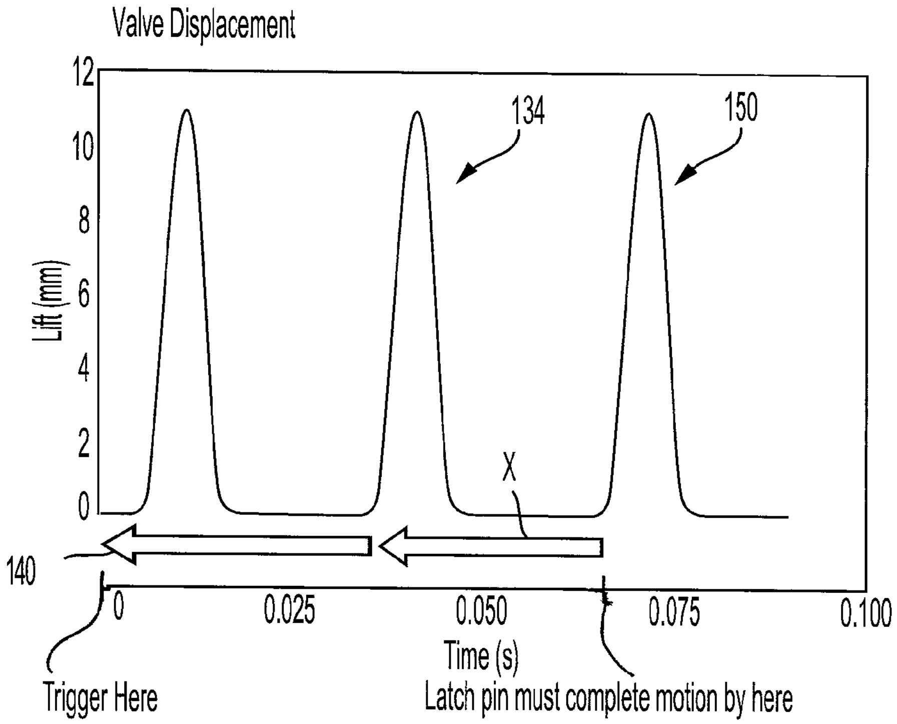

However, as discussed above, it is possible to have variability in the WA techniques. By triggering the solenoid assembly 500 at different timings, different valve lift techniques can be achieved. For example, at first engine speed, an early exhaust valve opening can be implemented and at a second engine speed, an earlier or later exhaust valve opening can be implemented relative to the first early exhaust valve opening. So, the triggering timing can be thought of as a range 140, as shown in FIG. 8. Then, the latch pin motion can also occur in a range X.

By mapping latch pin motion versus time at various voltage/temperature combinations, the triggering timing can be established. Switching the rocker arm 10 ideally occurs before the second lift event 134 of FIG. 8 or after the second lift event 134. If switching happens during the second lift event 134, there is a risk of mis-shift or critical shift. Such unfavorable conditions can occur when the latch pin 28 is half way in or half way out, or generally not all the way extended or not all the way retracted.

Mapping valve displacement lift versus time can also be mapped to establish triggering timing. A trigger window 140 (range) for triggering the solenoid assembly 50, 500 can be established. The trigger window 140 can yield latch pin motion at a time "x" before a third lift 150. According to the present teachings, a plurality of variable trigger timing maps are determined and stored in an engine control unit for a plurality of engine speeds.

Variable trigger timing can result in instances where switching occurs during the second lift event 134, or instances where the switching occurs subsequent to the second lift event 134. No "in between" cases of significant partial un-latching events occur when the solenoid assembly is triggered on lift just prior to a cam cycle requiring the latch pin in the first position. As a result, the risk of mis-shifts and critical shifts are minimized.

The methods disclosed herein select the timing of the triggering of the solenoid assembly as a function of system response time such that triggering consistently occurs at an optimal time regardless of operating conditions.

A control system can be implemented for operating an electro-mechanical valvetrain system in a variable valve actuation technique such as cylinder deactivation, among others. The control system can comprise a switching rocker arm such as a triple roller rocker arm, a slider type rocker arm, a roller finger follower, among other rocker arms. As illustrated the rocker arm has at least an inner arm, an outer arm and a latch pin selectively movable between a first position where the latch pin does not contact the inner arm, and a second position wherein the latch pin contacts the inner arm. A solenoid assembly connected to the control system can be triggered by the control system, resulting in selective actuation of the latch pin. A controller such as ECU 220 determines a timing of the triggering of the solenoid assembly 500 based on a temperature T on line 222 and a voltage V on line 224 of the electro-mechanical WA valvetrain system. The Temperature T, Voltage V, Engine Speed ES can be measured by sensors or solved for. But, ECU 220 collects necessary inputs on lines 222, 224, 226. A processor in ECU 220 can process collected data algorithmically using stored programming.

Figure 6:
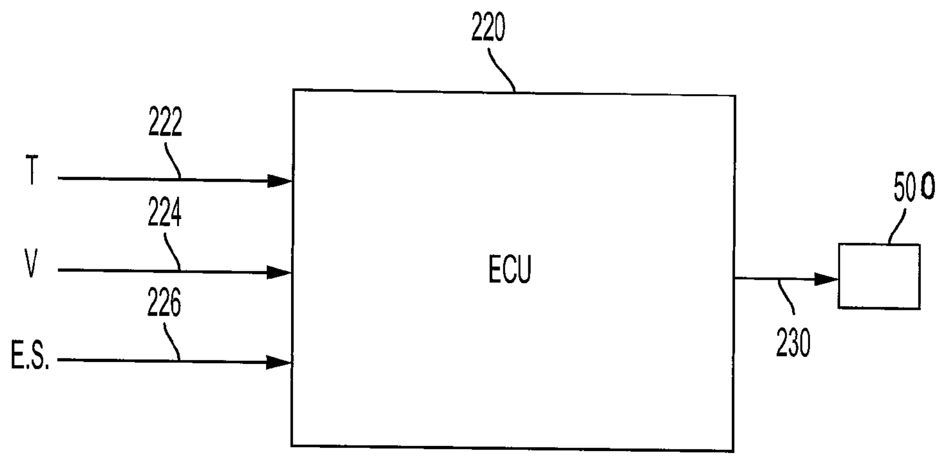
FIG. 6 is a schematic of a control system.

The control system of FIG. 6 FIG. 6 can include the engine control unit (ECU) 220 that monitors temperature T and voltage V inputs 222 and 224 respectively. The ECU 220 determines an optimal timing for the triggering of the solenoid 500 and outputs a signal 230 indicative of when to trigger the solenoid assembly 500. Again, the optimal timing of triggering of the solenoid 500 can vary based on temperature T and voltage V as described above. The ECU 220 commands the solenoid assembly 500 to trigger such that it will finish moving at the same time regardless of temperature T and voltage V. In some examples, the ECU 220 can also determine the optimal timing based also on an engine speed ES.

Other implementations will be apparent to those skilled in the art from consideration of the specification and practice of the examples disclosed herein.

What is claimed is:

1. A switching rocker arm assembly, comprising:
a switching rocker arm configured to engage a valve, the switching rocker arm movable by contact with a cam having a lift portion and a base circle portion, the switching rocker arm comprising:
an inner arm;
an outer arm pivotably secured to the inner arm and having a latch bore; and
a latch pin selectively movable between a first position where the latch pin does not contact the inner arm, and a second position wherein the latch pin contacts the inner arm;
a solenoid assembly comprising an armature;
an actuation lever extending between the solenoid assembly and the switching rocker arm; and
a linkage pivotally coupling to the armature and providing actuation of the actuation lever, the linkage comprising a pin and a slot, wherein the pin is configured to move linearly or non-linearly in the slot.

2. The switching rocker arm assembly of claim 1, further comprising a latch lever extending from the latch pin.

3. The switching rocker arm assembly of claim 2, wherein the actuation lever is selectively movable into contact with the latch lever, the latch lever configured to urge the latch pin into the second position when the actuation lever contacts the latch lever.

4. The switching rocker arm assembly of claim 3, wherein the actuation lever comprises a spring-loaded hinge, and wherein energizing the solenoid assembly while the switching rocker arm is in contact with the lift portion of the cam results in the spring-loaded hinge being pre-loaded so that the actuation lever acts on the latch lever to urge the latch pin into the second position as the cam rotates from the lift portion to the base circle portion.

5. The switching rocker arm assembly of claim 1, wherein the solenoid assembly is an electromechanical solenoid.

6. The switching rocker arm assembly of claim 5, wherein the armature of the solenoid assembly is biased by at least one compliance spring out of the solenoid assembly.

7. The switching rocker arm assembly of claim 6, wherein the slot controls actuation forces for moving the actuation lever and the latch pin.

8. The switching rocker arm assembly of claim 7, wherein the slot is a crescent shape.

9. A method for switching a switchable rocker arm assembly, the method comprising:
processing engine speed data to select a timing of triggering for a solenoid assembly of a switchable rocker arm assembly to energize, the switchable rocker arm assembly further comprising a switching rocker arm movable by contact with a cam having a lift portion and a base circle; an actuation lever extending between the solenoid assembly and the switching rocker arm; and the solenoid assembly further comprising an armature;
energizing the solenoid assembly while the switching rocker arm is in contact with the lift portion of the cam, wherein a linkage pivotally coupling to the armature and providing actuation of the actuation lever comprises a pin and a slot, the slot controlling actuation forces for selectively moving the actuation lever based on energizing the solenoid assembly, and the pin being configured to move linearly or non-linearly in the slot; and
adjusting the timing of triggering of the solenoid assembly as the engine speed data indicates a change in engine speed.

10. The method of claim 9 wherein the determining the timing of triggering of the solenoid assembly comprises determining a preferred timing of triggering based on a look-up table that corresponds to a given engine speed.

11. The method of claim 9 wherein the timing of triggering of the solenoid assembly is determined relative to a sequence of a first, a second and a third lift event, and wherein the determining the timing of triggering of the solenoid assembly comprises determining a preferred timing such that switching of the switching rocker arm associated with the solenoid assembly concludes subsequent to the second lift event.

12. The method of claim 9 wherein the switching rocker arm further comprises an inner arm; an outer arm pivotably secured to the inner arm; and a latch pin selectively movable between a first position where the latch pin does not contact the inner arm, and a second position wherein the latch pin contacts the inner arm; further wherein energizing the solenoid assembly is associated with switching of the switchable rocker arm on the base circle of the cam such that the latch pin moves to the first position where the latch pin does not contact the inner arm.

13. A method for switching a switchable rocker arm assembly, the method comprising:
determining an operating temperature of an electro-mechanical valvetrain system, the electro-mechanical valvetrain system comprising a switching rocker arm movable by contact with a cam; a solenoid assembly; and an actuation lever extending between the solenoid assembly and the switching rocker arm; the solenoid assembly comprising an armature, a linkage pivotally coupling to the armature and providing actuation of the actuation lever further comprising a pin and a slot;
determining a voltage available to the solenoid assembly in the electro-mechanical valvetrain system;
determining a timing of triggering of the solenoid assembly to energize based on the determined operating temperature and voltage; and
commanding triggering of the solenoid assembly to energize based on the determined timing, wherein actuation forces for selectively moving the actuation lever based on energizing the triggered solenoid assembly are controlled by the slot, the pin being configured to move linearly or non-linearly in the slot.

14. A control system for operating an electro-mechanical valvetrain cylinder deactivation system, the control system comprising:
a switching rocker arm having an inner arm, an outer arm and a latch pin selectively movable between a first position where the latch pin does not contact the inner arm, and a second position wherein the latch pin contacts the inner arm;
a solenoid assembly comprising an armature and configured to trigger to result in selective actuation of the latch pin;
an actuation lever extending between the solenoid assembly and the switching rocker arm, wherein a linkage pivotally coupling to the armature and providing actuation of the actuation lever comprises a pin in a slot, and wherein the pin is configured to move linearly or non-linearly in the slot; and
a controller configured to command a timing of the triggering of the solenoid assembly by determining and processing a temperature and a voltage of the solenoid assembly of the electro-mechanical valvetrain cylinder deactivation system.

15. A switching rocker arm assembly, comprising:

a switching rocker arm configured to engage a valve, the switching rocker arm comprising:

a latch bore; and a latch pin selectively movable in the latch bore between an extended first position and a retracted second position;

a solenoid assembly comprising an armature biased by at least one compliance spring out of the solenoid assembly; and an actuation lever extending between the solenoid assembly and the switching rocker arm, wherein a linkage pivotally coupling to the armature and providing actuation of the actuation lever comprises a pin in a slot, and wherein the slot controls actuation forces for moving the actuation lever and the latch pin.

16. The switching rocker arm assembly of claim 15, wherein the slot is a crescent shape.

17. A switching rocker arm assembly, comprising:

a switching rocker arm configured to engage a valve, the switching rocker arm comprising:

a latch bore; and a latch pin selectively movable in the latch bore between an extended first position and a retracted second position; and a solenoid assembly configured to trigger to result in selective actuation of the latch pin, the solenoid assembly comprising an armature; and an actuation lever extending between the solenoid assembly and the switching rocker arm, wherein a linkage pivotally coupling to the armature and providing actuation of the actuation lever comprises a pin in a slot, wherein the slot comprises an oblong shape or a crescent shape.

* * * * *